Feb. 15, 1927.
E. W. PENDERGRAFT
ANIMAL POKE
Filed March 20, 1926
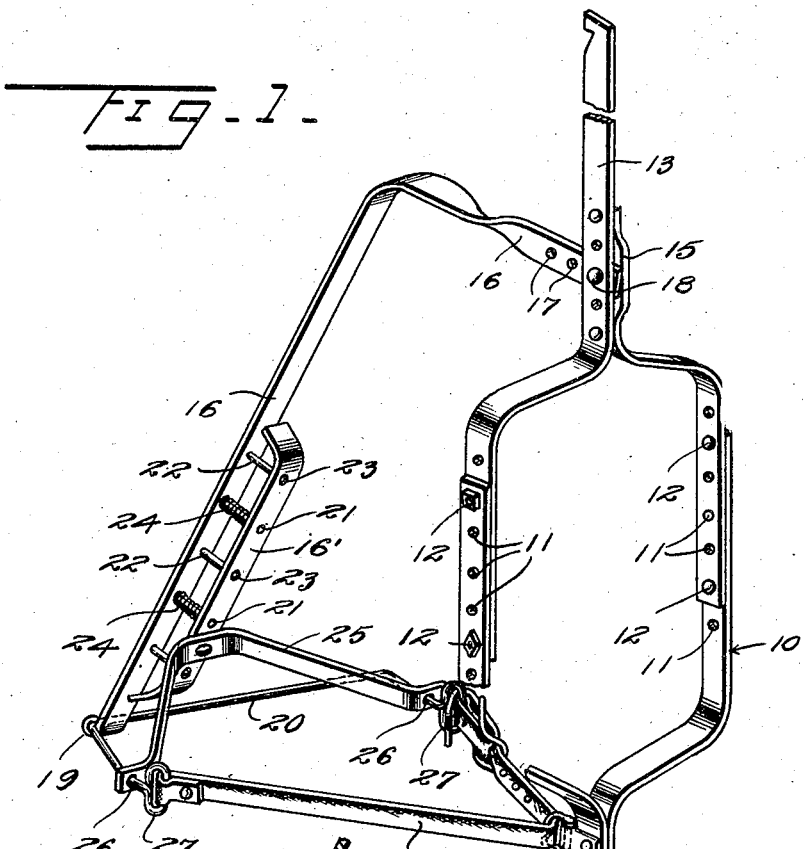
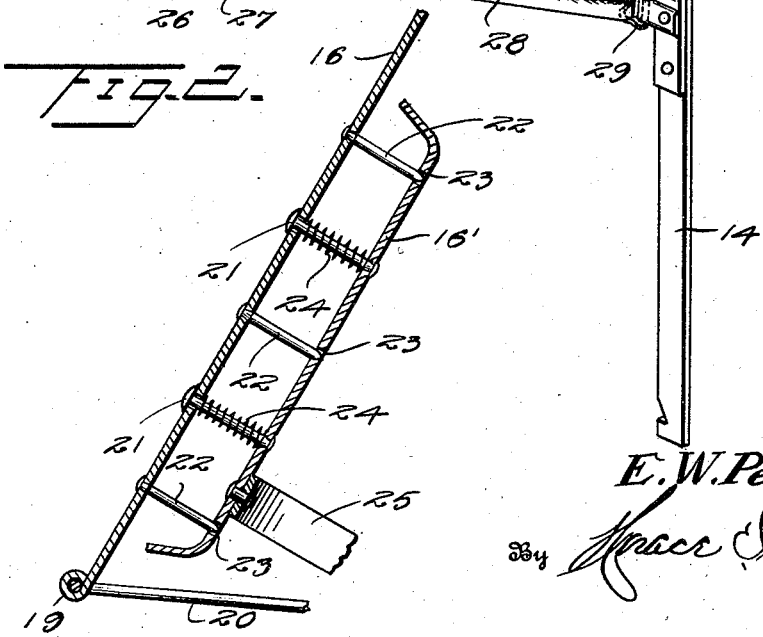
Inventor
E. W. Pendergraft.
By
Attorney Patented Feb. 15, 1927.

1,617,497

UNITED STATES PATENT OFFICE.

ELBERT W. PENDERGRAFT, OF SELIGMAN, MISSOURI.

ANIMAL POKE.

Application filed March 20, 1926. Serial No. 96,275.

This invention relates to new and useful improvements in restraining devices, and particularly to restraining devices for use in connection with animals.

One object of the invention is to provide a device of this character which can be comfortably worn by the animal, but which will effectively restrain the animal from breaking fences, and from butting other animals.

Another object is to provide a device of this character which does not press against the animal's shoulders, when the animal attempts to push through a fence, but which will press against the animal's head and nose, and cause pointed elements to engage the head and nose, to restrain the animal.

Other objects and advantages will be apparent from the following description when taken in connection with the accompanying drawing.

In the drawing:

Figure 1 is a perspective view of an animal poke made in accordance with the present invention.

Figure 2 is a longitudinal sectional detail view through the portion of the device which carries the pointed elements.

Referring particularly to the accompanying drawing, there is shown a neck encircling yoke 10, the sides of which are extensible by means of the openings 11 and bolts 12, whereby to permit adjustment to animals of different sizes. From the upper and lower ends of the yoke there extend the arms 13 and 14, respectively, which are especially adapted to prevent the animal poking its head through a fence, with a view to passing thereunder or thereover. The upper end of one of the side members of the yoke, above the point of attachment to the other side, is offset from the upper arm 13, as indicated at 15, and disposed between this offset portion, and the arm 13, is the upper end of a substantially L-shaped bar 16, said offset portion and arm 13 being provided with a series of openings 17, for the interchangeable reception of a retaining bolt 18, which holds the bar 16 in place. The other arm of the bar 16 extends downwardly on the forehead and nose of the animal, and terminates in an eye 19, in which is engaged the bight portion of a downwardly and rearwardly extending yoke 20. Slidably disposed through the longer arm of the bar 16, adjacent the eye 19, are the pins 21, and secured in said arm, intermediate the pins, and at equally spaced distances outwardly thereof, are the pointed pins 22. A strip 16' is disposed between the longer arm of the bar 16, and the head and nose of the animal, said strip having the other ends of the pins 21 secured thereto, and being formed with openings 23 through which the pointed pins 22 are arranged to slide, when the strip 16' is moved toward the said arm of the bar, by the pressure of the animal's head and nose thereagainst. Encircling each of the pins 21, between the arm of the bar 16, and the strip 16', are the coil springs 24, which normally and yieldably maintain the strip in spaced relation to said arm, and the pointed pins withdrawn inwardly so as not to touch the animal's head or nose, in the normal wear of the device. A yoke 25, formed of strap metal, is secured at its intermediate portion to the lower end of the strip 16', and extends downwardly and rearwardly, with its ends provided with openings 26 receiving the arms of the yoke 20 slidably therethrough. The ends of the arms of the yoke 20 are formed with eyes or loops 27 in which are, respectively, secured and adjustable, the ends of the strap, 28, of leather, said strap having its intermediate portion disposed through a loop 29 on the lower end of the main yoke 10, and extending at the sides of the jaws of the animal, when the device is properly adjusted on the animal.

It will be seen that the strap yoke 25 rests across the top of the nose of the animal, and when the animal presses either of the arms 13 or 14 against a fence, or the longer arm of the bar 16 against such fence, or another animal, the animal's nose will force the strip 16' in the direction of the bar 16, with the result that the pointed pins 22 will be forced into the animal's head and nose, producing sufficient pain to cause the animal to desist.

The device is adjustable in various places, so that it may be adapted to fit animals of different sizes, such as cattle, horses, sheep, goats, and the like.

What is claimed is:

1. An animal poke including a neck ring, an arm extending downwardly and forwardly from the ring, pointed elements on the arm directed toward the animal's head and nose, and an apertured guard resiliently supported on the arm and arranged to be moved by the animal to cause the pointed elements to pass therethrough and into the animal's head and nose.

2. An animal poke including a neck ring, an arm extending from the upper portion of the ring, an apertured strip resiliently supported on the arm for movement toward and away therefrom, pointed members on the arm for passage through the apertured strip upon movement of the latter, and a nose straddling member secured to the said strip for movement by the nose of the animal.

3. An animal poke including a neck ring, an arm extending downwardly and forwardly from the ring, pointed elements on the arm directed toward the animal's head and nose, an apertured guard resiliently supported on the arm and arranged to be moved by the animal to cause the pointed elements to pass therethrough and into the animal's head and nose, and means for limiting the movement of the guard whereby to prevent the pointed elements projecting too far beyond the guard.

4. An animal poke including a neck ring, an arm extending downwardly and forwardly from the ring, pointed elements on the arm directed toward the animal's head and nose, an apertured guard resiliently supported on the arm and arranged to be moved by the animal to cause the pointed elements to pass therethrough and into the animal's head and nose, and means on the guard for engagement with the arm to limit the movement of the guard and the uncovering of the pointed elements thereby.

In testimony whereof, I affix my signature.

ELBERT W. PENDERGRAFT.